(12) United States Patent
Mitterreiter et al.

(10) Patent No.: US 6,668,464 B2
(45) Date of Patent: Dec. 30, 2003

(54) COUPLING AND ANGLE ENCODER WITH SUCH A COUPLING

(75) Inventors: Johann Mitterreiter, Chieming (DE); Kurt Feichtinger, Palling (DE); Hermann Meyer, Weissbach (DE)

(73) Assignee: Dr. Johannes Heidenhain GmbH, Traunreuh (DE)

( * ) Notice: Subject to any disclaimer, the term of this patent is extended or adjusted under 35 U.S.C. 154(b) by 0 days.

(21) Appl. No.: 10/093,954

(22) Filed: Mar. 8, 2002

(65) Prior Publication Data

US 2002/0148123 A1 Oct. 17, 2002

(30) Foreign Application Priority Data

Mar. 9, 2001 (DE) .......................................... 101 11 368

(51) Int. Cl.⁷ ................................................. G01B 5/24
(52) U.S. Cl. ......................... 33/1 PT; 33/572; 33/1 N; 33/706; 33/707; 33/708
(58) Field of Search ................................ 33/1 PT, 572, 33/1 N, 706, 707, 708; 403/267

(56) References Cited

U.S. PATENT DOCUMENTS

| | | | | |
|---|---|---|---|---|
| 5,657,544 A | * | 8/1997 | Ota et al. .................... | 33/1 PT |
| 5,758,427 A | | 6/1998 | Feichtinger et al. | |
| 5,771,594 A | | 6/1998 | Feichtinger | |
| 6,470,577 B1 | * | 10/2002 | Tondorf et al. ............. | 33/1 PT |
| 6,501,367 B2 | * | 12/2002 | Fleig et al. .................. | 338/162 |

FOREIGN PATENT DOCUMENTS

| | | |
|---|---|---|
| DE | 195 21 845 | 12/1996 |
| DE | 196 29 585 | 3/1997 |
| DE | 200 08 590 | 11/2000 |
| EP | 0 762 081 | 10/2000 |

OTHER PUBLICATIONS

U.S. patent application Publication, Pub. No. US 2002/0002777, Torr, Jan. 10, 2002.*
U.S. patent application Publication, Pub. No. US 2001/0034943, Itomi, Nov. 1, 2001.*
U.S. patent application Publication, Pub. No. US 2002/0196833, Igaki et al., Dec. 26, 2002.*
U.S. patent application Publication, Pub. No. US 2002/0078761, Meyer, Jun. 27, 2002.*

* cited by examiner

*Primary Examiner*—Christopher W. Fulton
*Assistant Examiner*—Amanda J Hoolahan
(74) *Attorney, Agent, or Firm*—Brinks Hofer Gilson & Lione

(57) ABSTRACT

A coupling for the torsion-proof, but radially resilient connection of a stator of an angle encoder with a stator of an object to be measured, the coupling includes a spring element that is either normally in a first position but when the spring element is bent out by a bending force the spring element moves from the first position through a click point to a second position where the spring element engages a portion of the angle encoder or the spring element normally is biased in a first position but when the bias of the spring element at said first position is canceled the spring element is moved to a second position where the spring element engages a portion of the angle encoder.

38 Claims, 6 Drawing Sheets

COUPLING AND ANGLE ENCODER WITH SUCH A COUPLING

Applicants claim, under 35 U.S.C. §119, the benefit of priority of the filing date of Mar. 9, 2001 of a German patent application, copy attached, Serial Number 101 11 368.4, filed on the aforementioned date, the entire contents of which is incorporated herein by reference.

BACKGROUND OF THE INVENTION

1. Field of the Invention

The present invention relates to a torsion-proof, but radially resilient connection of a stator of an angle encoder with a stator of an object to be measured. The present invention further relates to an angle encoder having a stator and a shaft, a coupling and a spring element.

2. Discussion of Related Art

Angle encoders are used for determining the angular position, the angular speed or other angle-dependent values of a rotor of an object to be measured, in particular a motor, and for making them available for purposes of display, control of a machine tool, regulation or other evaluations.

For the compensation of alignment errors in the course of coupling the shaft of the angle encoder to the rotor, and therefore of radial deflections of the rotatable rotor, a coupling is arranged between the stator of the angle encoder and the stationary object to be measured, which connects the stator of the angle encoder in a torsion proof, but radially and preferably also axially resilient manner, with the stationary object to be measured.

Such an angle encoder is known, for example, from DE 195 21 845 C2.

In connection with the angle encoder in accordance with DE 196 29 585 A1 it was found that it is advantageous for certain applications to arrange the coupling between the stator and the stationary object to be measured in the area of the bearing device of the rotor. The installation space available in this area is very limited, so that problems in reaching and actuating the device for radial clamping of the coupling can arise in actual use.

An angle encoder with a coupling between the stator and the stationary object to be measured is furthermore described in DE 200 08 590 U1. The leaf spring arms of the coupling are crammed in place on the stationary object because of external pressure, or spring pressure because of a deformation of the coupling. The introduction of the clamping force takes place by an axial displacement of the angle encoder with respect to the stationary object to be measured, and the clamping force is directly proportional to the relative axial position of the two elements. Assembly is made more difficult because of this.

OBJECTS AND SUMMARY OF THE INVENTION

An object of the present invention is based on disclosing a coupling for an angle encoder that is easy to mount.

This object is attained by a coupling for the torsion-proof, but radially resilient connection of a stator of an angle encoder with a stator of an object to be measured, the coupling includes a spring element either normally in a first position but when the spring element is bent out by a bending force the spring element moves from the first position through a click point to a second position where the spring element engages a portion of the angle encoder or the spring element is normally biased in a first position but when the bias of the spring element at said first position is canceled the spring element is moved to a second position where the spring element engages a portion of the angle encoder.

It is a further object of the present invention to disclose an angle encoder having this coupling.

This further object is attained by an angle sensor that includes a first stator and a shaft for measuring an angular position between a second stator of an object to be measured and a rotor, which is rotated with respect to the second stator around an axis of rotation and a coupling for torsion-proof, but radially resilient connection of the first stator with the second stator. The coupling includes a spring element that is either normally in a first position but when the spring element is bent out by a bending force the spring element moves from the first position through a click point to a second position or the spring element normally biased in a first position but when the bias of the spring element at the first position is canceled the spring element is moved to a second position.

The advantages obtained by the present invention reside in particular in that the coupling can be installed in the vicinity of the bearing device of the rotor of the angle encoder, and that in spite of crowded installation conditions the coupling can be fastened to the stationary object solidly and fixed against relative rotation. A stable and space-saving mounting is possible. During mounting and operation, the force required for assured clamping does not act, at least not completely, on the angle encoder.

Further advantages, as well as details, of the present invention ensue from the following description of a preferred embodiment, making reference to the drawings.

DETAILED DESCRIPTION OF THE PREFERRED EMBODIMENTS

Figure 1:
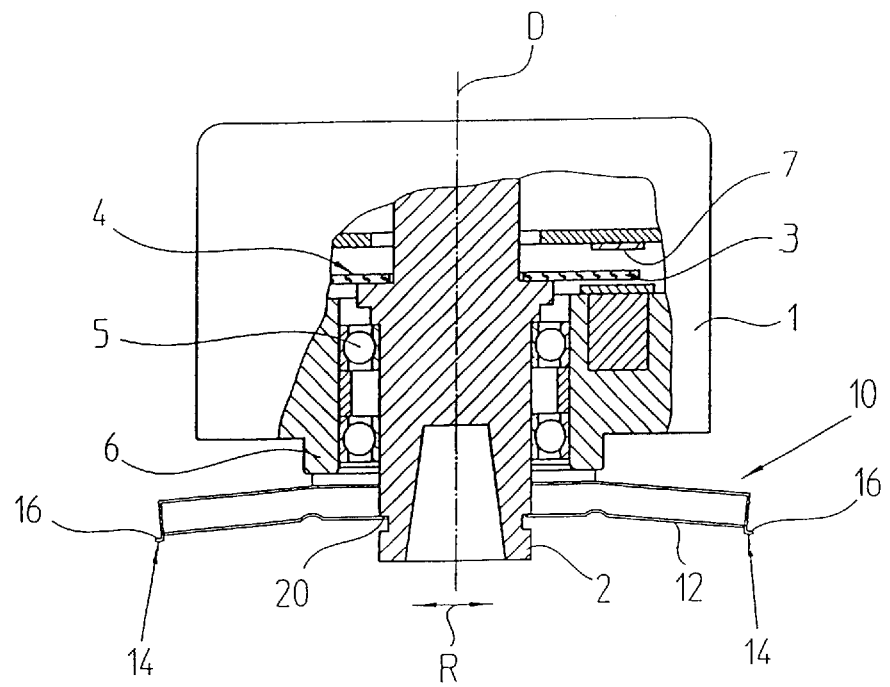
FIG. 1 is a cross section through an embodiment of an angle encoder with a coupling in a first mounting position in accordance with the present invention.
Figure 2:
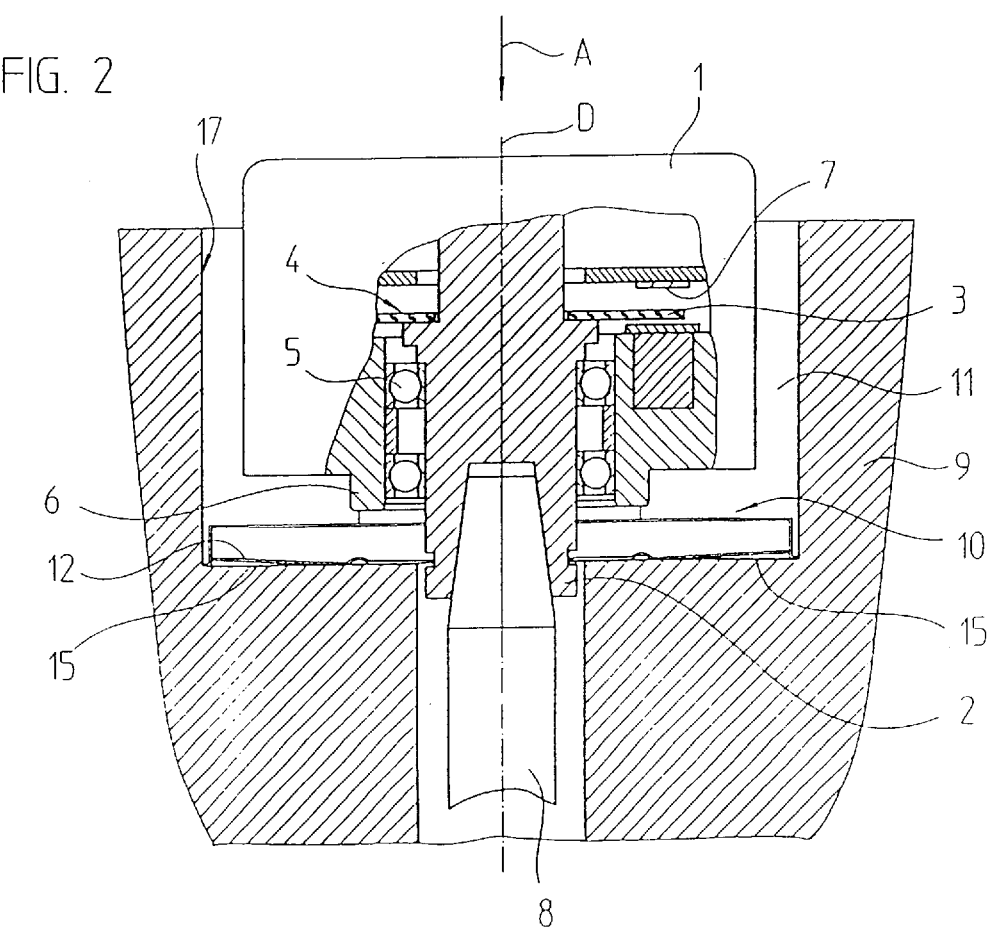
FIG. 2 shows the angle encoder in FIG. 1 in the installed state.
Figure 3:
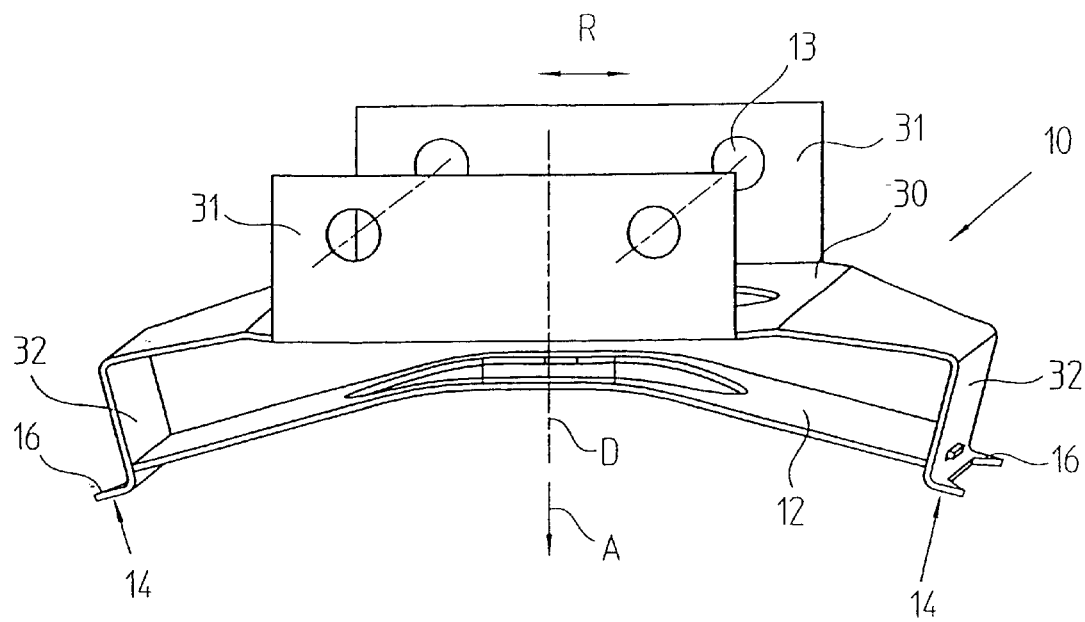
FIG. 3 is a perspective representation of the coupling of the angle encoder in FIGS. 1 and 2.

A first exemplary embodiment of the invention is represented in FIGS. 1 to 3. The angle encoder 1 includes a shaft 2, to which a graduated disk 3 with a measurement representation 4 has been attached. The shaft 2 is seated, rotatable around the axis of rotation D, by a bearing device 5 in the stator 6 of the angle encoder 1. The angular position of the shaft 2 in relation to the stator 6 is measured in that the measurement representation 4 is scanned in a known manner by a scanning unit 7 affixed to the stator 6. In this case, the measurement representation 4 can be a pattern in the form of an incremental or coded graduation, which can be optically, magnetically, capacitively or inductively scanned.

For measuring the angular position of a rotor 8, which is rotatable around the axis of rotation D, in relation to a stationary object 9, the shaft 2 must be connected, fixed against relative rotation, with the rotor 8. The stator 6 must also be connected in a torsion-proof manner with the stationary object 9. In the example represented, the rotor is the shaft 8 of an electric motor, and the stationary object is the motor housing 9.

For compensating alignment errors between the shaft 2 and the shaft 8, as well as for compensating tumbling movements, as well as axial displacement, of the shaft 8, the stator 6 is mounted on the motor housing 9 by a torsion-proof, but radially and also preferably axially elastically compensating coupling 10.

Before the angle encoder 1 is inserted into the mounting space 11, which is constituted by the motor housing 9, one connecting area of the coupling 10 is rigidly fastened on the stator 6 of the angle encoder 1. This can be accomplished by screws, which engage bores 13 (FIG. 3) of the coupling 10. Fastening can also be provided by riveting, gluing or welding, but the coupling 10 can also be formed on the stator 6.

Thereafter, the angle encoder 1 with the coupling 10 is pushed into the mounting space 11 and is axially (direction A) guided to the motor shaft 8. Note that in order to accomplish this insertion, the spring 12 is curved so that the radial, exterior circumference of the clamping jaws 16 is less than the radius of the circumferential surface 17.

In the course of this axial guidance, an axially acting stop face 14 of the coupling 10 abuts on a stop face 15 of the motor housing 9, which extends transversely with respect to the axis of rotation D. A position is reached during the continued approach of the angle encoder 1, in which the connecting areas 16 of the coupling 10 assigned to the motor housing 9 suddenly move radially outward and are spread against the tube-shaped circumferential surface 17 of the motor housing 9. In what follows, these second connecting areas of the coupling will be called clamping jaws 16.

This jump of the clamping jaws 16 from a first radial position into a second radial position of a greater radial distance (direction R) is achieved by a curved spring 19, which jumps over from a first position into a second position by a clicker effect.

The clamping force required for radial clamping of the coupling 10 is introduced by the cooperation of the two stop faces 14 and 15 only until the click point of the curved spring 12 connecting the two clamping jaws 16 has been reached.

The bending force required for this acts counter to the curved shape of the spring 12.

Thus, only the bending force of the curved spring 12 needs to be supplied during the mounting process. After the jump and after overcoming the click point of the spring 12, no axial force, which is dependent on the radial clamping force acts anymore on the angle encoder 1. The radial clamping force is exerted by the leaf-like spring 12, which is advantageously axially supported in the center area on the motor housing 9 after it has been bent over and therefore cannot jump over into a second position of rest, but is maintained in a position in which it exerts the maximum spreading force in the radial direction. The spring 12 and the shaft 2, or rotor 8, are of such dimensions that, in the mounted position in accordance with FIG. 2, the spring 12 does not touch the shaft 2 and the rotor 8.

During assembly the spring 12 is advantageously supported in the center area on the stator 6 or on a shoulder 20 of the shaft 2 for producing the bending force in the axial direction A.

The jump-over of the clamping jaws 16 from a first radial position into a second radial position by the cooperation of the stop faces 14 and 15 during the insertion of the angle encoder 1 into the mounting space 11 is particularly advantageous. However, the jump-over can also be initiated in a manner not shown by an actuating tool introduced from the outside.

The coupling 10 is represented in a perspective view in FIG. 3. The coupling includes a base 30 with two guide elements 31, which are bent at right angles, extend parallel with each other and parallel with respect to the axis of rotation D, and can be screwed to the stator 6. Two further guide elements 32 are formed on the base 30, which extend parallel with each other at least to a large extent, wherein these further guide elements 32 extend at right angles with respect to the base 30, as well as at right angles with respect to the first guide elements 31. The clamping jaws 16 for a torsion-proof fastening on the motor housing 9 are formed at the ends of the further guide elements 32. This coupling 10 has been advantageously produced from spring steel in one piece as a punched and bent part. Guide elements 31, or 32, extending parallel with respect to the axis of rotation D, each constitute a parallel guidance in the radial direction R.

The base 30 and/or the tongues 31, 32 can also be embodied in a framework-like manner in accordance with EP 0 762 081 B1.

Figure 4:
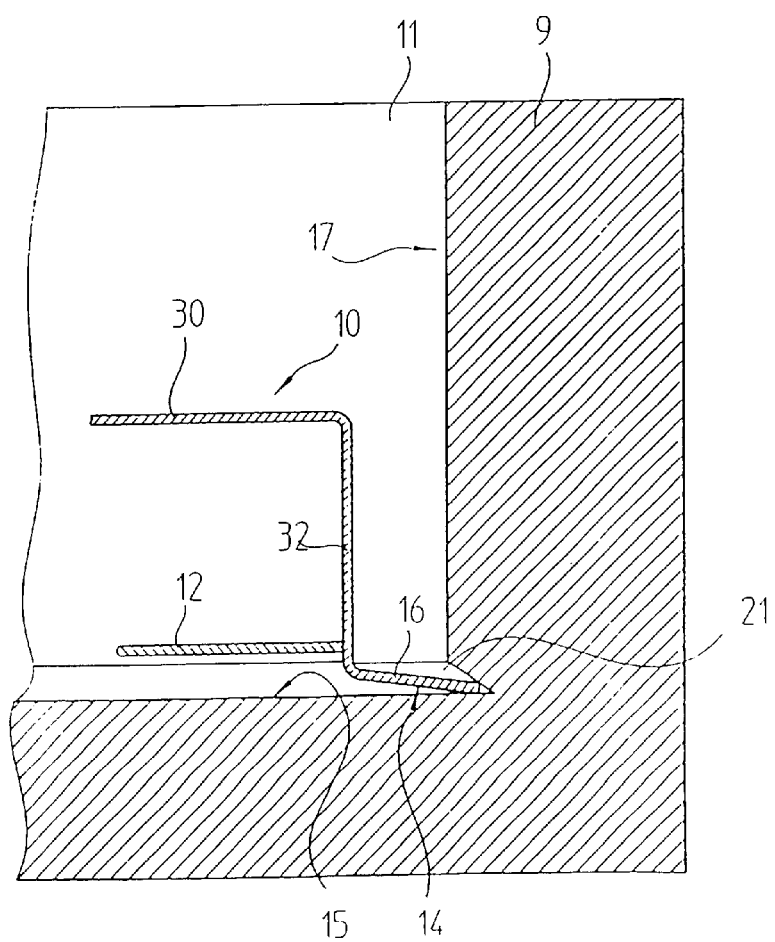
FIG. 4 is an example of a clamping area of the coupling.

The two clamping jaws 16 are connected with each other by the leaf-like spring 12. This spring 12 is curved in the shape of an arc so that it jumps over from this curved position of rest as the initial position into a second position differing from the first when a pressure force is exerted on it. This pressure force—also called bending force—must be of sufficient size that a click point is overcome. This jump-over of the spring is also known as clicker effect since a clicking sound is generated during the jumping from the curved position of rest shown in FIG. 3 into the second position shown in FIG. 4.

Figure 5:
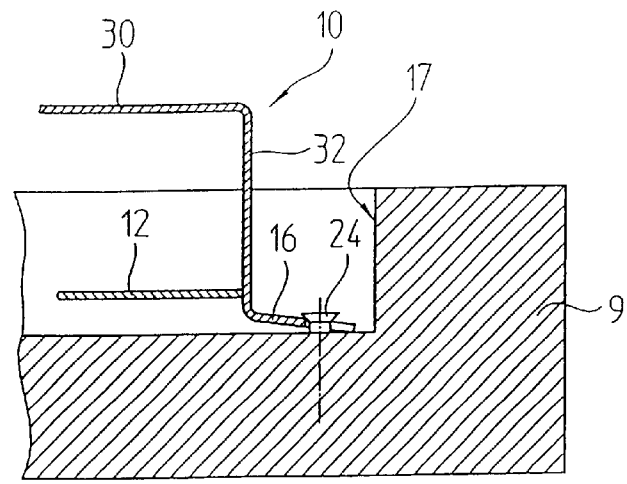
FIG. 5 is a further example of a clamping area of the coupling of FIGS. 1–3 in a sectional view.
Figure 6:
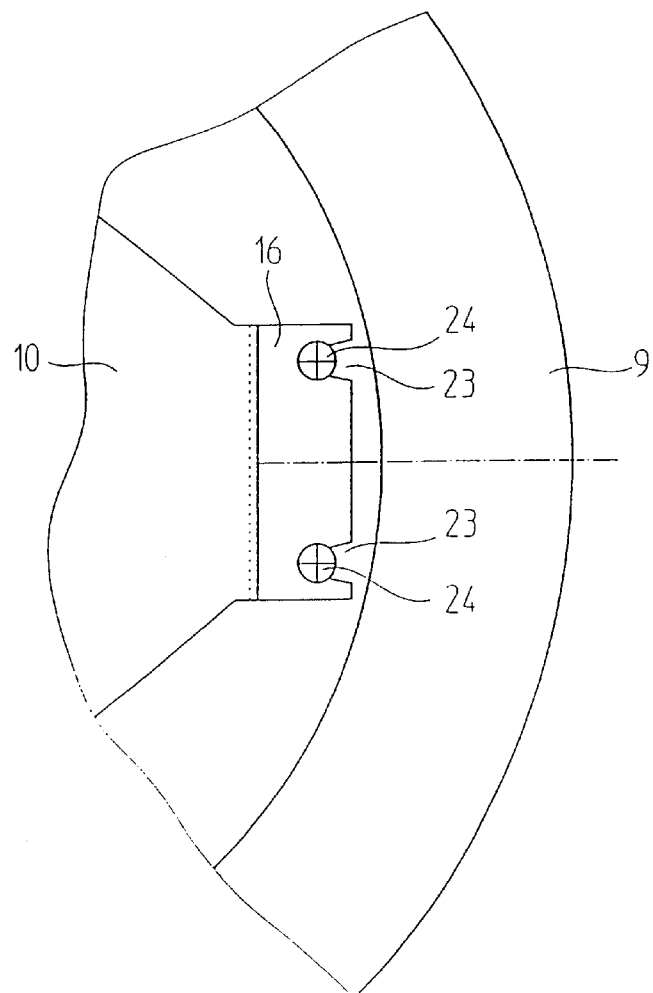
FIG. 6 shows the clamping area in FIG. 5 in a view from above.

The clamping jaws 16 can be embodied in different ways. In accordance with FIG. 4 they are embodied in such a way that they engage a groove 21, coming to a point, of the motor housing 9. In accordance with FIGS. 5 and 6, the clamping jaws 16 additionally are interlockingly connected in the circumferential direction (direction of rotation of the shaft 2) with the motor housing 9. At least one recess 23 is provided for this purpose in each clamping jaw 16, which is engaged by a protrusion in the form of a pin 24 of the motor housing 9. The clamping jaws 16 are supported in a radially clamping manner on the pins 24 and/or on the tube-shaped circumferential surface 17. The recesses 23 are conically shaped and taper radially inward, so that the edges of the recess 23 are pushed against the pins 24 free of play by the radial clamping forces. The interlocking connection acts as a safety against twisting. The interlocking connection can also be provided by depressions on the motor housing 9, which are engaged by protrusions of the clamping jaws 16.

Figure 7:
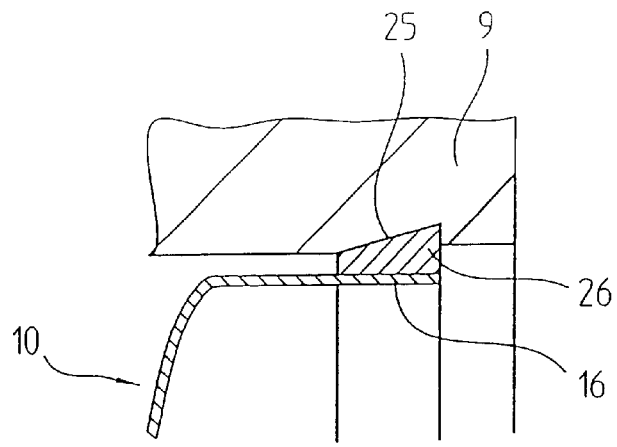
FIG. 7 shows a second embodiment of a clamping area of the coupling of FIGS. 1–3.

The clamping jaws 16 in accordance with FIG. 7 also engage a groove 25 of the motor housing 9 in an interlocking manner. Elements 26, which increase the static friction, for example in the form of a rubber coating, are arranged at the ends of the clamping jaws 16.

Figure 8:
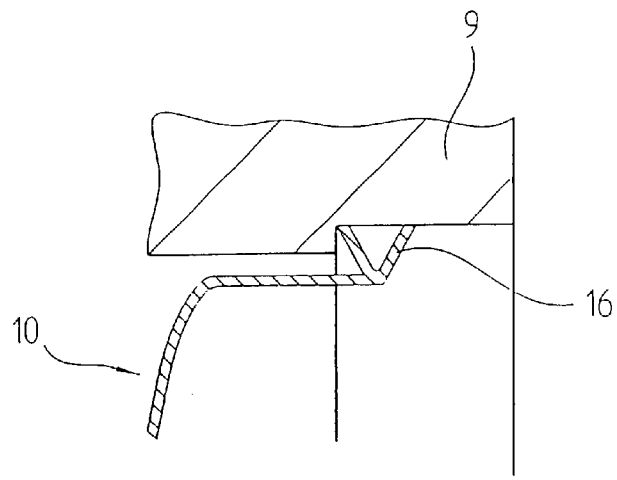
FIG. 8 shows a third embodiment of a clamping area of the coupling of FIGS. 1–3.

The clamping jaws 16 in accordance with FIG. 8 are designed as V-shaped spreading elements.

Figure 11:
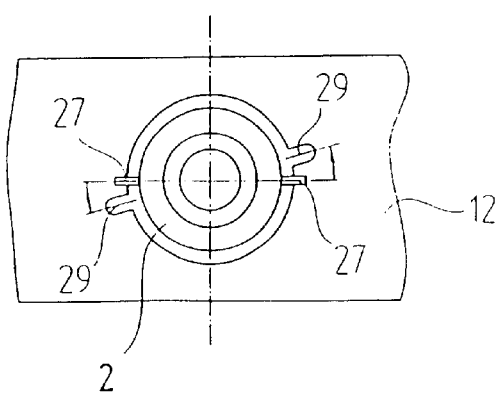
FIG. 11 is a portion of the coupling in FIG. 9 in a view from above.
Figure 9:
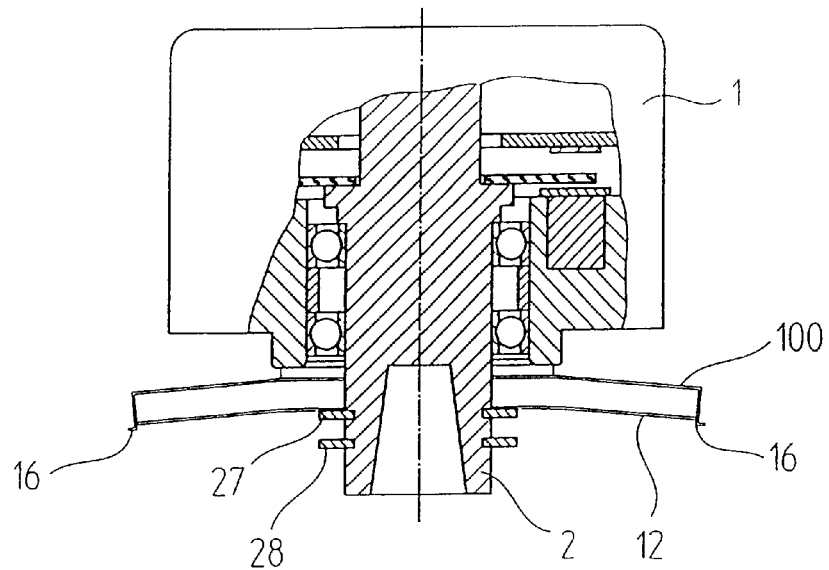
FIG. 9 represents a second embodiment of an angle encoder with a coupling in a first mounting position in accordance with the present invention.
Figure 10:
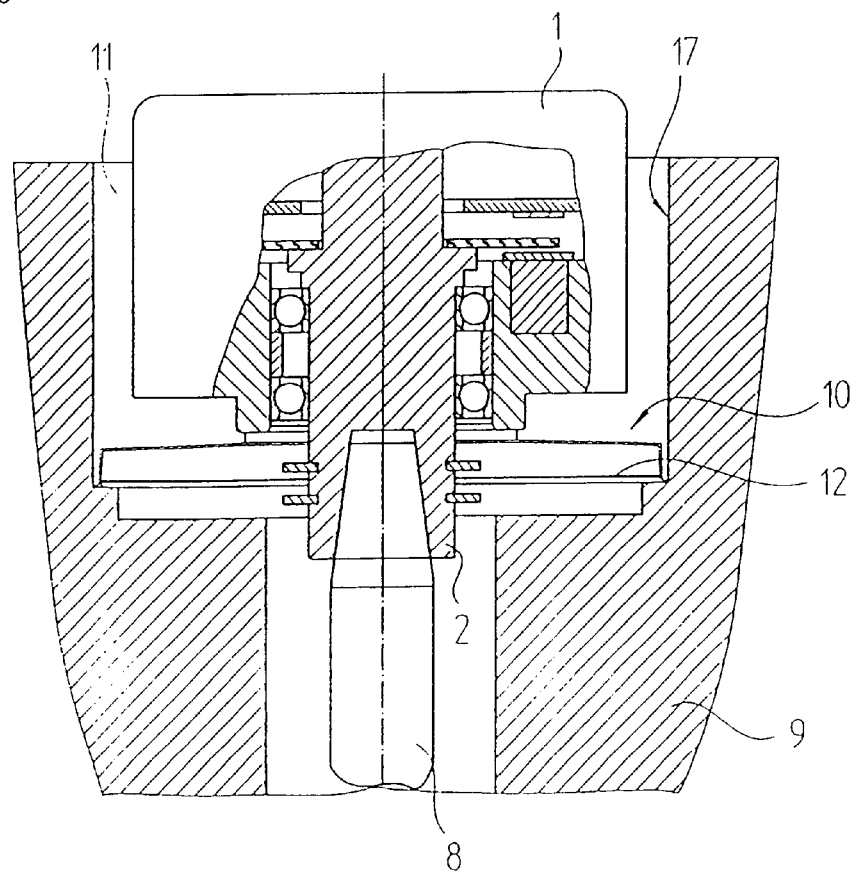
FIG. 10 shows the angle encoder in FIG. 9 in the installed state.

A second example of an angle encoder 1 with a coupling 10 is represented in FIGS. 9 to 11. Reference is made to the previous example in regard to the basic structure of the angle encoder 1 and the coupling 10. The two clamping jaws 16 are connected with each other by the leaf-shaped spring 12. This spring 12 is a leaf spring or a diaphragm, curved in an arc shape, so that it is displaced from this curved, biased position of rest as the initial position into a second position differing therefrom, in particular by being bent out. In contrast to the previous example, the curved position of rest of the spring 12 is predetermined by at least one pin 27 of the shaft 2. Thus, the spring 12 is biased, bent in the axial direction, by the pin 27. The angle encoder 1 with the coupling 10 fastened thereon is inserted in this position, represented in FIG. 9, into the mounting space 11 and the shaft 2 is connected, fixed against relative rotation, with the shaft 8. Thereafter the bias of the spring 12 is cancelled, so that it jumps over into a second position and the two clamping jaws 16, which are located radially opposite each other, move radially outward and are clamped in a torsion-proof manner against the circumferential surface 17. The cancellation of the bias of the spring 12 takes place by rotating the shaft 2 (schematically represented in the view from above in FIG. 11) until the pin 27 fastened thereon reaches a recess 29 of the spring 12 and permits an axial movement of the spring 12. The end position of the spring 12 and of the clamping jaws 16 achieved by this is represented in FIG. 10. Disassembly is performed in that the angle encoder 1 with the coupling 10 fastened thereon is pulled out of the mounting space 11—possibly by an auxiliary tool—and in the process the spring 12 comes into contact with stops 28 arranged on the shaft 2 and in this way bends them out axially, because of which the radial distance between the clamping jaws 16 is reduced and the clamping jaws 16 come out of contact with the circumferential surface 17.

Figure 12:
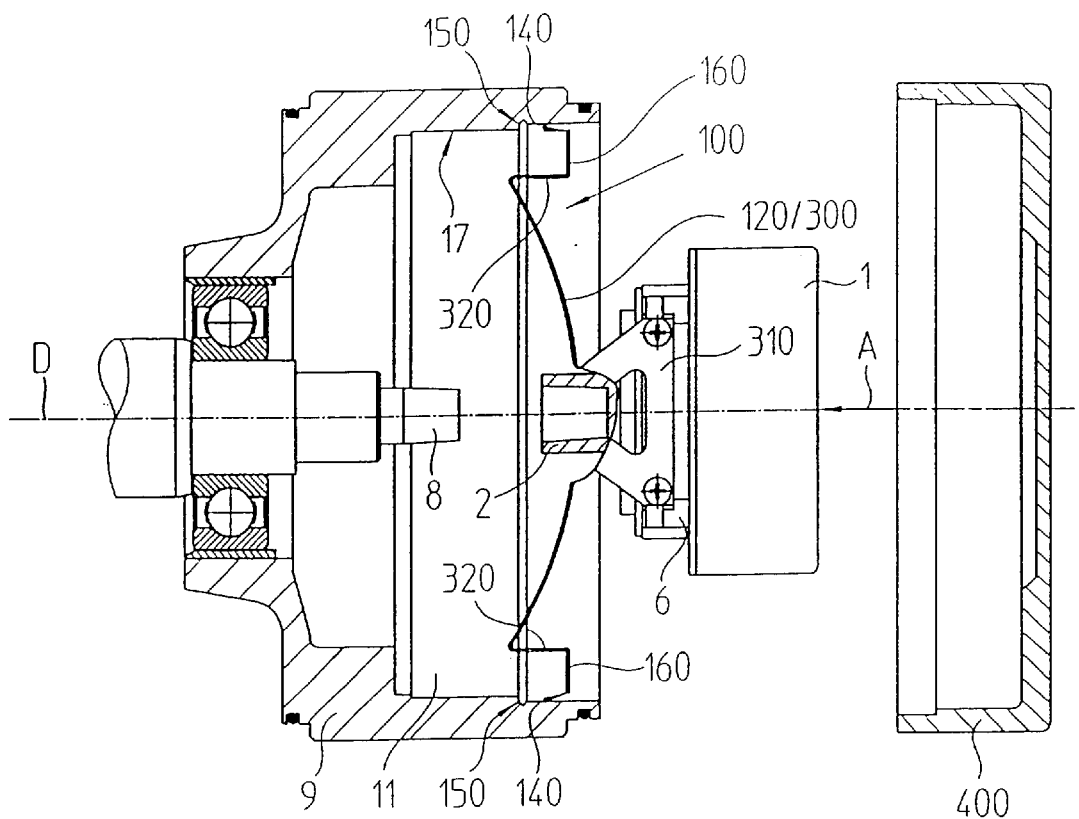
FIG. 12 represents a third embodiment of an angle encoder with a coupling in a first mounting position in accordance with the present invention.
Figure 13:
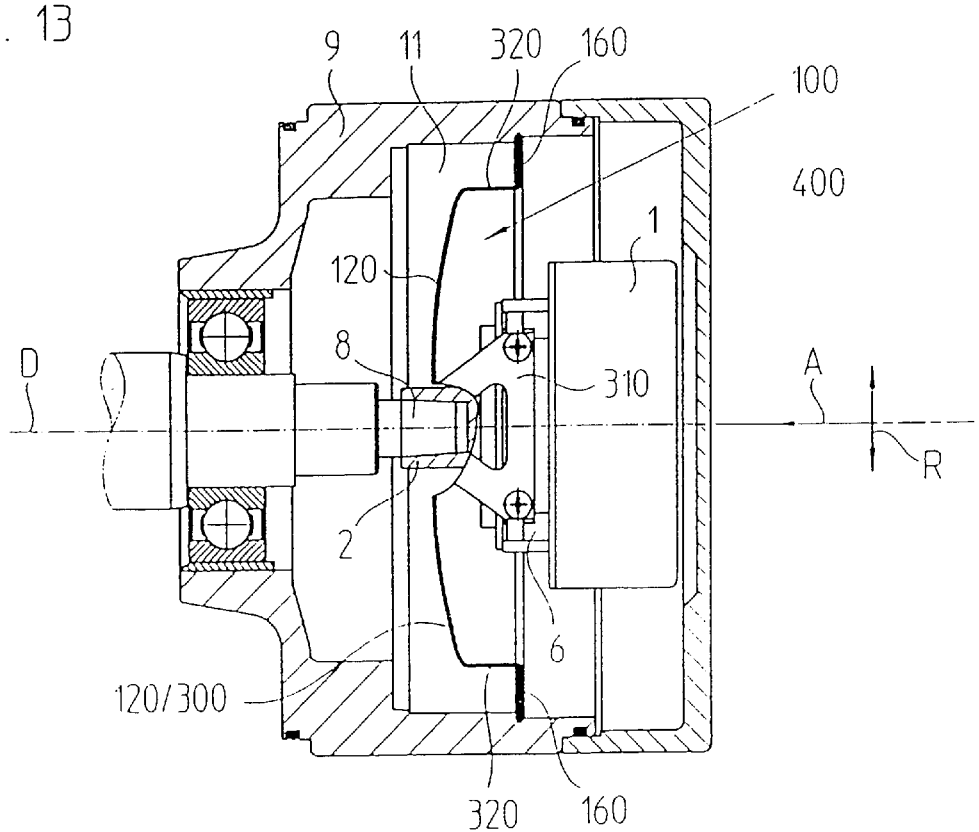
FIG. 13 shows the angle encoder in FIG. 12 in the installed state.

A third example of an angle encoder 1 with a coupling 100 is represented in FIGS. 12 and 13. The coupling 100 again includes first guide elements 310 which are fastened in a torsion-proof manner on the stator 6 of the angle encoder 1, and of further guide elements 320, which are clampingly fastened in a torsion-proof manner on the motor housing 9 by clamping jaws 160. In this example, the curved leaf-shaped spring 120 for achieving the clicker effect is the base 300 of the coupling 100, on which the guide elements 310 and 320 are formed.

As represented in FIG. 12, the angle encoder 1 with the coupling 100 mounted thereon is displaced in the axial direction A into the mounting space 11 until the stop faces 140 of the coupling 100 come into contact axially with the stop faces 150 of the motor housing 9. In the course of the continued pressing in of the angle encoder 1 a position is reached, in which a bending force directed opposite the arc shape is exerted on the spring 120, during which the click point for the jump-over of the spring 120 is passed. Because of this jump-over of the spring 120, the angle encoder 1 moves further in the direction of the shaft 8 until the outer cone of the shaft 8 comes into contact with the inner cone of the shaft 2 and the shafts 8 and 2 are frictionally connected with each other by this. This second mounting position is represented in FIG. 13.

As with the first exemplary embodiment, here, too, the connection of the coupling 100 with the motor housing 9 is based on the clicker effect of a spring 120, in that prior to the jump-over of the spring 120 the clamping jaws 160 have a lesser mutual distance from each other in the radial direction R than after the jump-over of the spring 120. Following the jump-over of the spring 120 from a curved initial position (position of rest) into a second position differing from the first, the clamping jaws 160 are spread in the radial direction R against the tube-shaped circumferential surface 17 of the motor housing 9, and are therefore clampingly supported in a torsion-proof manner.

In accordance with FIG. 13, the mounting space 11 is closed by a cover 400 at the end of the mounting process.

In all examples the guide elements 31, 32, 310, 320 are advantageously radially deflectable leaf springs.

The explained clamping of the coupling 10, 100 can alternatively or additionally also be employed between the coupling 10, 100 and the stator 6 of the angle encoder 1.

The coupling 10, 100 is advantageously arranged at the end of the angle encoder 1 toward the shaft in a space-saving manner. However, it can also be fastened on the other end of the angle encoder.

The frictional and/or interlocked torsion-proof connection of the shafts 2 and 6 can take place by known tools with screws or collet chucks.

The foregoing description is provided to illustrate the invention, and is not to be construed as a limitation. Numerous additions, substitutions and other changes can be made to the invention without departing from its scope as set forth in the appended claims.

We claim:

1. A coupling for the torsion-proof, but radially resilient connection of a stator of an angle encoder with a stator of an object to be measured, said coupling comprising:
   a base; and
   a spring element attached to said base, said spring element normally in a first position but when said spring element is bent out by a bending force said spring element moves from said first position through a click point to a second position.

2. The coupling in accordance with claim 1, wherein said spring element is bent in an arc-shape and connects clamping jaws with each other, and a mutual distance between said clamping jaws is less in said first position than in said second position.

3. The coupling in accordance with claim 2, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with each other.

4. The coupling in accordance with claim 3, wherein said two first guide elements and said second guide elements are formed on a common base, and wherein said clamping jaws are arranged at ends of said two first guide elements or said two second guide elements.

5. The coupling in accordance with claim 4, wherein said base is formed by said spring element bent in the shape of an arc.

6. The coupling in accordance with claim 5, wherein said spring element is bent in the shape of an arc and connects said two first guide elements or said two second guide elements with each other in an area of said clamping jaws, and said spring element is arranged at least to a large degree in a plane which extends perpendicularly with respect to an axis of rotation.

7. The coupling in accordance with claim 1, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with each other.

8. The coupling in accordance with claim 7, wherein said two first guide elements and said two second guide elements comprise leaf spring arms.

9. A coupling for the torsion-proof, but radially resilient connection of a stator of an angle encoder with a stator of an object to be measured, said coupling comprising:
   a base; and
   a spring element attached to said base, said spring element normally biased in a first position but when said bias of said spring element at said first position is canceled said spring element is moved to a second position.

10. The coupling in accordance with claim 9, wherein said spring element is bent in an arc-shape and connects clamping jaws with each other, and a mutual distance between said clamping jaws is less in said first position than in said second position.

11. The coupling in accordance with claim 10, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with each other.

12. The coupling in accordance with claim 11, wherein said two first guide elements and said second guide elements are formed on a common base and wherein said clamping jaws are arranged at ends of said two first guide elements or said two second guide elements.

13. The coupling in accordance with claim 12, wherein said base is formed by said spring element bent in the shape of an arc.

14. The coupling in accordance with claim 13, wherein said spring element is bent in the shape of an arc and connects said two first guide elements or said two second guide elements with each other in an area of said clamping jaws, and said spring element is arranged at least to a large degree in a plane which extends perpendicularly with respect to an axis of rotation.

15. The coupling in accordance with claim 9, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with each other.

16. The coupling in accordance with claim 15, wherein said two first guide elements and said two second guide elements comprise leaf spring arms.

17. An angle sensor, comprising:
   a first stator and a shaft for measuring an angular position between a second stator of an object to be measured and a rotor, which is rotated with respect to said second stator around an axis of rotation;
   a coupling for torsion-proof, but radially resilient connection of said first stator with said second stator, said coupling comprising:
      a base; and
      a spring element attached to said base, said spring element normally in a first position but when said spring element is bent out by a bending force said spring element moves from said first position through a click point to a second position.

18. The angle encoder in accordance with claim 17, wherein said spring element is bent in an arc-shape and connects clamping jaws with each other, and a mutual distance between said clamping jaws is less in said first position than in said second position.

19. The angle encoder in accordance with claim 18, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with said axis of rotation.

20. The angle encoder in accordance with claim 18, wherein in a bent-out position of said spring element said clamping jaws are spread on an inner tube-shaped circumferential surface of a drive unit.

21. The angle encoder in accordance with claim 19, wherein said two first guide elements and said second guide elements are formed on said base, and wherein said clamping jaws are arranged at ends of said two first guide elements or said two second guide elements.

22. The angle encoder in accordance with claim 21, wherein said base is formed by said spring element bent in the shape of an arc.

23. The angle encoder in accordance with claim 21, wherein said spring element is bent in the shape of an arc and connects said two first guide elements or said two second guide elements with each other in an area of said clamping jaws, and said spring element is arranged at least to a large degree in a plane which extends perpendicularly with respect to said axis of rotation.

24. The angle encoder in accordance with claim 17, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with said axis of rotation.

25. The angle encoder in accordance with claim 17, wherein said coupling is connected in a torsion-proof manner with said first stator, and said coupling comprises a first set of stop faces extending transversely with respect to said axis of rotation, which cooperate with a second set of stop faces of said second stator and also extend transversely with respect to said axis of rotation, wherein said bending force is introduced by cooperation of said first set and said second set of stop faces.

26. An angle sensor, comprising
   a first stator and a shaft for measuring an angular position between a second stator of an object to be measured and a rotor, which is rotated with respect to said second stator around an axis of rotation;
   a coupling for torsion-proof, but radially resilient connection of said first stator with said second stator, said coupling comprising:
      a base; and
      a spring element attached to said base, said spring element normally biased in a first position but when said bias of said spring element at said first position is canceled said spring element is moved to a second position.

27. The angle sensor in accordance with claim 26, wherein said spring element is bent in an arc-shape and connects clamping jaws with each other, and a mutual distance between said clamping jaws is less in said first position than in said second position.

28. The angle sensor in accordance with claim 27, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with said axis of rotation.

29. The angle sensor in accordance with claim 27, wherein in a bent-out position of said spring element said clamping jaws are spread on an inner tube-shaped circumferential surface of a drive unit.

30. The angle sensor in accordance with claim 28, wherein said two first guide elements and said second guide elements are formed on said base, and wherein said clamping jaws are arranged at ends of said two first guide elements or said two second guide elements.

31. The angle sensor in accordance with claim 30, wherein said base is formed by said spring element bent in the shape of an arc.

32. The angle sensor in accordance with claim 30, wherein said spring element is bent in the shape of an arc and connects said two first guide elements or said two second guide elements with each other in an area of said clamping jaws, and said spring element is arranged at least to a large degree in a plane which extends perpendicularly with respect to said axis of rotation.

33. The angle sensor in accordance with claim 26, further comprising two first guide elements, which are located diametrically opposite each other and extend at least to a great degree parallel with each other, and two second guide elements, which are offset by 90° from said two first guide elements, are located diametrically opposite each other and extend at least to a great degree parallel with said axis of rotation.

34. The angle sensor in accordance with claim 26, wherein said coupling is connected in a torsion-proof manner with said first stator, and said coupling comprises a first set of stop faces extending transversely with respect to said axis of rotation, which cooperate with a second set of stop faces of said second stator and also extend transversely with respect to said axis of rotation, wherein said bending force is introduced by cooperation of said first set and said second set of stop faces.

35. A coupling for the torsion-proof, but radially resilient connection of a stator of an angle encoder with a stator of an object to be measured, said coupling comprising:
    a spring element normally in a first position but when said spring element is bent out by a bending force said spring element moves from said first position through a click point to a second position where said spring element engages a portion of said angle encoder.

36. A coupling for the torsion-proof, but radially resilient connection of a stator of an angle encoder with a stator of an object to be measured, said coupling comprising:
    a spring element attached to said base, said spring element normally biased in a first position but when said bias of said spring element at said first position is canceled said spring element is moved to a second position to engage a portion of said angle encoder.

37. An angle sensor, comprising:
    a first stator and a shaft for measuring an angular position between a second stator of an object to be measured and a rotor, which is rotated with respect to said second stator around an axis of rotation;
    a coupling for torsion-proof, but radially resilient connection of said first stator with said second stator, said coupling comprising:
        a spring element normally in a first position but when said spring element is bent out by a bending force said spring element moves from said first position through a click point to a second position.

38. An angle sensor, comprising
    a first stator and a shaft for measuring an angular position between a second stator of an object to be measured and a rotor, which is rotated with respect to said second stator around an axis of rotation;
    a coupling for torsion-proof, but radially resilient connection of said first stator with said second stator, said coupling comprising:
        a spring element normally biased in a first position but when said bias of said spring element at said first position is canceled said spring element is moved to a second position.

* * * * *

UNITED STATES PATENT AND TRADEMARK OFFICE
CERTIFICATE OF CORRECTION

PATENT NO.     : 6,668,464 B2
DATED          : December 30, 2003
INVENTOR(S)    : Johann Mitterreiter et al.

It is certified that error appears in the above-identified patent and that said Letters Patent is hereby corrected as shown below:

Title page,
Item [73], Assignee, delete "Traunreuh" and substitute -- Traunreut -- in its place.

Signed and Sealed this

Twenty-eighth Day of December, 2004

JON W. DUDAS
*Director of the United States Patent and Trademark Office*